(12) United States Patent
Wu

(10) Patent No.: US 11,241,730 B2
(45) Date of Patent: Feb. 8, 2022

(54) PORTABLE TEST INSTRUMENT FOR RIVET NUT SETTING TOOL

(71) Applicant: SOL AI TECHNOLOGY CO., LTD., Taoyuan (TW)

(72) Inventor: Sheng-Yuan Wu, Taoyuan (TW)

(73) Assignee: SOL AI TECHNOLOGY CO., LTD., Taoyuan (TW)

( * ) Notice: Subject to any disclaimer, the term of this patent is extended or adjusted under 35 U.S.C. 154(b) by 66 days.

(21) Appl. No.: 16/855,235

(22) Filed: Apr. 22, 2020

(65) Prior Publication Data

US 2021/0291257 A1 Sep. 23, 2021

(51) Int. Cl.
*G01L 5/00* (2006.01)
*B21J 15/38* (2006.01)
*G01L 1/22* (2006.01)
*B21J 15/10* (2006.01)

(52) U.S. Cl.
CPC .............. *B21J 15/38* (2013.01); *G01L 1/225* (2013.01); *G01L 5/0033* (2013.01); *B21J 15/105* (2013.01)

(58) Field of Classification Search
CPC ......... B21J 15/38; B21J 15/105; G01L 1/225; G01L 5/0033
See application file for complete search history.

(56) References Cited

U.S. PATENT DOCUMENTS

| | | | | |
|---|---|---|---|---|
| 3,008,598 A | * | 11/1961 | Martin | B25B 27/0014 72/391.8 |
| 4,612,793 A | * | 9/1986 | Klein | B25B 27/0014 72/391.8 |
| 2015/0360355 A1 | * | 12/2015 | Hsu | B25B 27/0014 81/469 |
| 2020/0070327 A1 | * | 3/2020 | Vollmer | B25B 27/0014 |

OTHER PUBLICATIONS

RivTest%20EN%20mail%20(1).pdf pp. 101 to 104 from HS-Technik RiveTest, 2013.*

* cited by examiner

*Primary Examiner* — Max H Noori
(74) *Attorney, Agent, or Firm* — Guice Patents PLLC

(57) ABSTRACT

A portable test instrument for a rivet nut setting tool is disclosed, and the portable test instrument includes a shell body, a circuit module disposed in the shell body, and a strain gauge having a part located in the shell body and electrically connected to the circuit module, and a display device. An end of the strain gauge is exposed to the shell body and used to mount with the rivet nut setting tool. The strain gauge can change a value of a signal transmitted to the circuit module when being forced to deform. The display device is disposed on the shell body and electrically connected to the circuit module, and configured to display data measured by the strain gauge.

9 Claims, 19 Drawing Sheets

US 11,241,730 B2

PORTABLE TEST INSTRUMENT FOR RIVET NUT SETTING TOOL

BACKGROUND OF THE INVENTION

1. Field of the Invention

The present invention relates to an instrument for detecting a pull force of a rivet nut setting tool in use, so as to conveniently know whether the pull force of the rivet nut setting tool in use is sufficient or appropriate.

2. Description of the Related Art

When a rivet nut is set, a pulling force is required to rivet the rivet nut to a target position; in order to quickly and easily set the rivet nut, a variety of rivet nut setting tools have appeared on the market, for example, Taiwan Patent Issue No. M536107 "rivet nut assembling tool", and Taiwan Patent Issue No. 1337905 "rivet nut machine". Different types or sizes of rivet nuts have different suitable pulling force ranges for setting, and parts of the rivet nut setting tool are inevitably worn after long-term use, so it causes reduction of the pull force and failure to set the rivet nut smoothly. This condition is often found when the rivet nut cannot be set smoothly during construction, or when the thread of the rivet nut is damaged during setting because of excessive pull force of the rivet nut setting tool. Although the rivet nut setting tool on the market generally has the function of adjusting pull force, in practice, the same type of rivet nut setting tools still have different performance due to the difference in component size or the quality of the assembly process level when the tools are delivered from factory; or, the adjusted pull force is not certainly correct because the components of the tool are worn after long-term use, for example, the rivet nut setting tool may be adjusted to decrease pull force by 10 Kgf in scale, but the pull force is actually decreased by 7 Kgf only because of tolerances or wear; or a pneumatic rivet nut setting tool is inputted with a specific air pressure to set a rivet nut of a certain size, but the pneumatic rivet nut setting tool still has different pull force performances even if the input values are the same due to tolerance or wear.

As can be seen from the above, the conventional rivet nut setting tools on the market can only roughly adjust the pulling forces thereof, and it is difficult to accurately adjust to the required value of the pull force. This is a key issue to be solved in the industry.

SUMMARY OF THE INVENTION

An objective of the present invention is to provide a portable test instrument capable of detecting a pull force generated by a rivet nut setting tool in use, so as to solve the conventional problem that it is difficult to accurately adjust the pull force of the rivet nut setting tool to a required range.

In order to achieve the aforementioned objective and effect, the present invention provides a portable test instrument for a rivet nut setting tool including a shell body, a circuit module, a strain gauge and at least one display device. The circuit module is disposed inside the shell body. The strain gauge has a part located inside the shell body and is electrically connected to the circuit module, and an end of the strain gauge is exposed to the shell body and configured to mount with the rivet nut setting tool, and the strain gauge changes a value of a signal transmitted to the circuit module when being forced to deform. The at least one display device is disposed inside the shell body and electrically connected to the circuit module, and configured to display data measured by the strain gauge.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
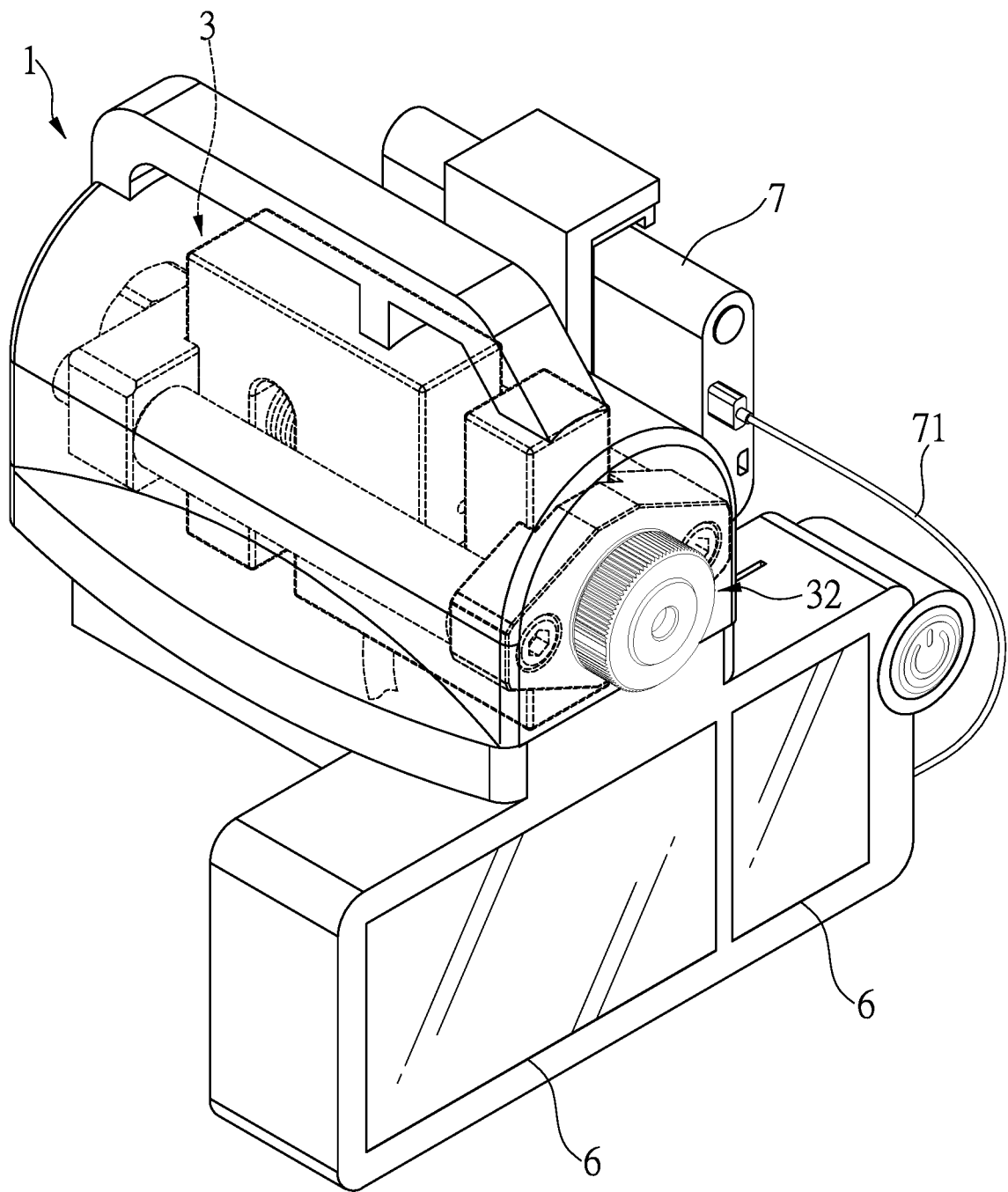
FIG. 1 is a perspective view of a portable test instrument for a rivet nut setting tool, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 2:
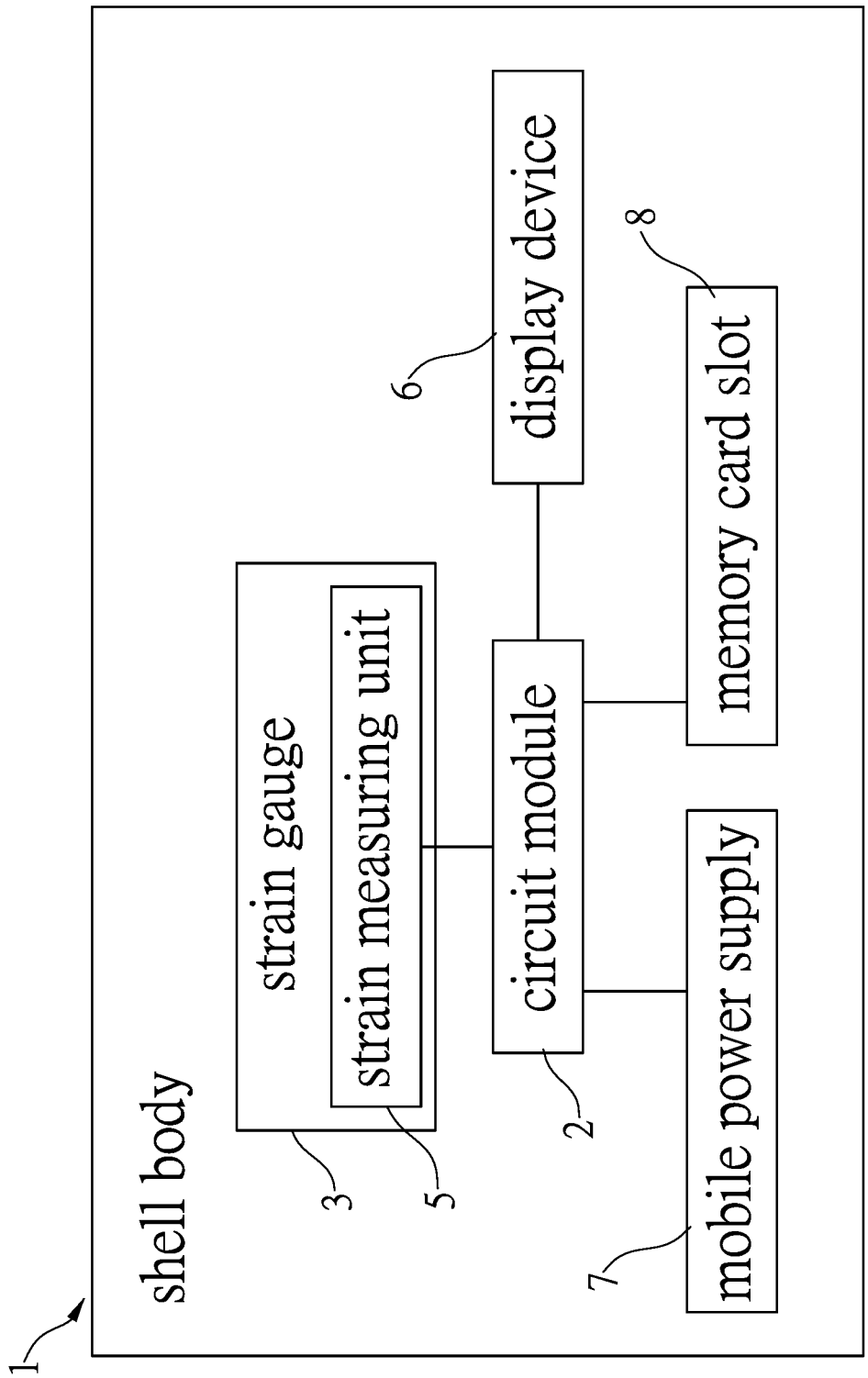
FIG. 2 is a block diagram of a portable test instrument for a rivet nut setting tool, according to the present invention.
Figure 3:
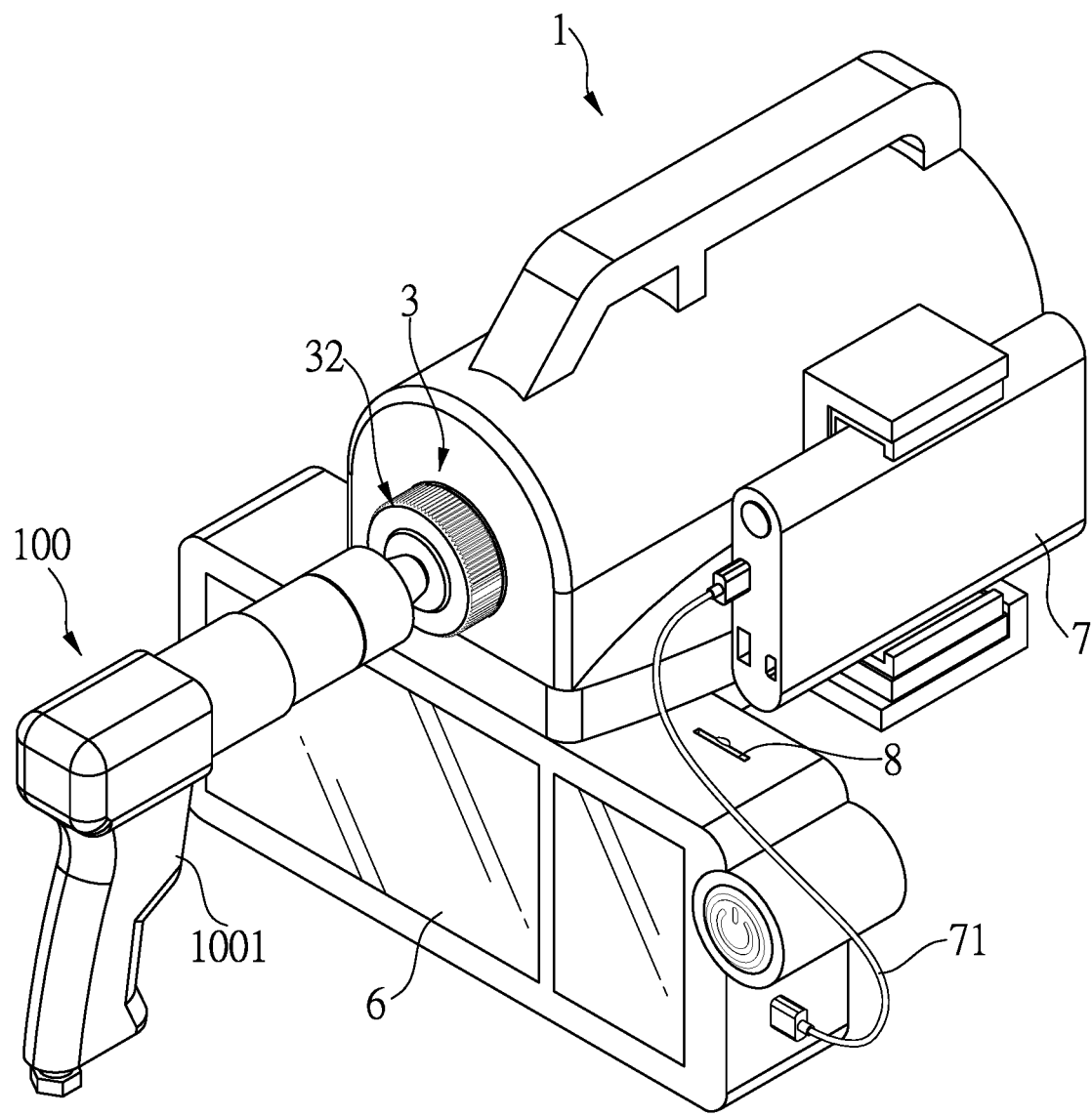
FIG. 3 is a schematic view of a portable test instrument mounted with a rivet nut setting tool, according to the present invention.

The embodiments of the present invention are described with reference to figures for more detailed understanding. As shown in FIGS. 1 to 3, a portable test instrument for rivet nut setting tool includes a shell body 1, a circuit module 2 disposed in the shell body 1, a strain gauge 3 and at least one display device 6. A part of strain gauge 3 is located inside the shell body 1 and electrically connected to the circuit module 2, and an end of the strain gauge 3 is exposed to the shell body 1 and configured to mount with the rivet nut setting tool 100. The strain gauge can change a value of a signal transmitted to the circuit module when being forced to deform. The at least one display device 6 is disposed on the shell body 1 and electrically connected to the circuit module 2, and configured to display data measured by the strain gauge 3. The strain gauge 3 is more accurate than a conventional hydraulic gauge and pneumatic gauge.

An end of the strain gauge 3 is exposed to the shell body 1, and it means that an end, which is mounted with the rivet nut setting tool 100, of the strain gauge 3 is not blocked by the shell body, as shown in FIG. 1, an end of the strain gauge 3 can be exposed out of the shell body; or in other embodiment, the strain gauge 3 can be located in the shell body fully, but the shell body has a through hole and the rivet nut setting tool 100 is mounted with the strain gauge 3 through the through hole.

In the embodiment of the present invention, the portable test instrument having two display devices 6 is taken as an example; however, in other embodiment, the display screens of the two display devices 6 can be integrated as a display device upon demands.

The at least one display device 6 displays the data in a waveform with a waveform data unit 61.

In the present invention, the manner of supplying power to the portable test instrument can be implemented by using a transformer to receive commercial power and electrically connect to the circuit module 2 of the present invention.

Figure 4:
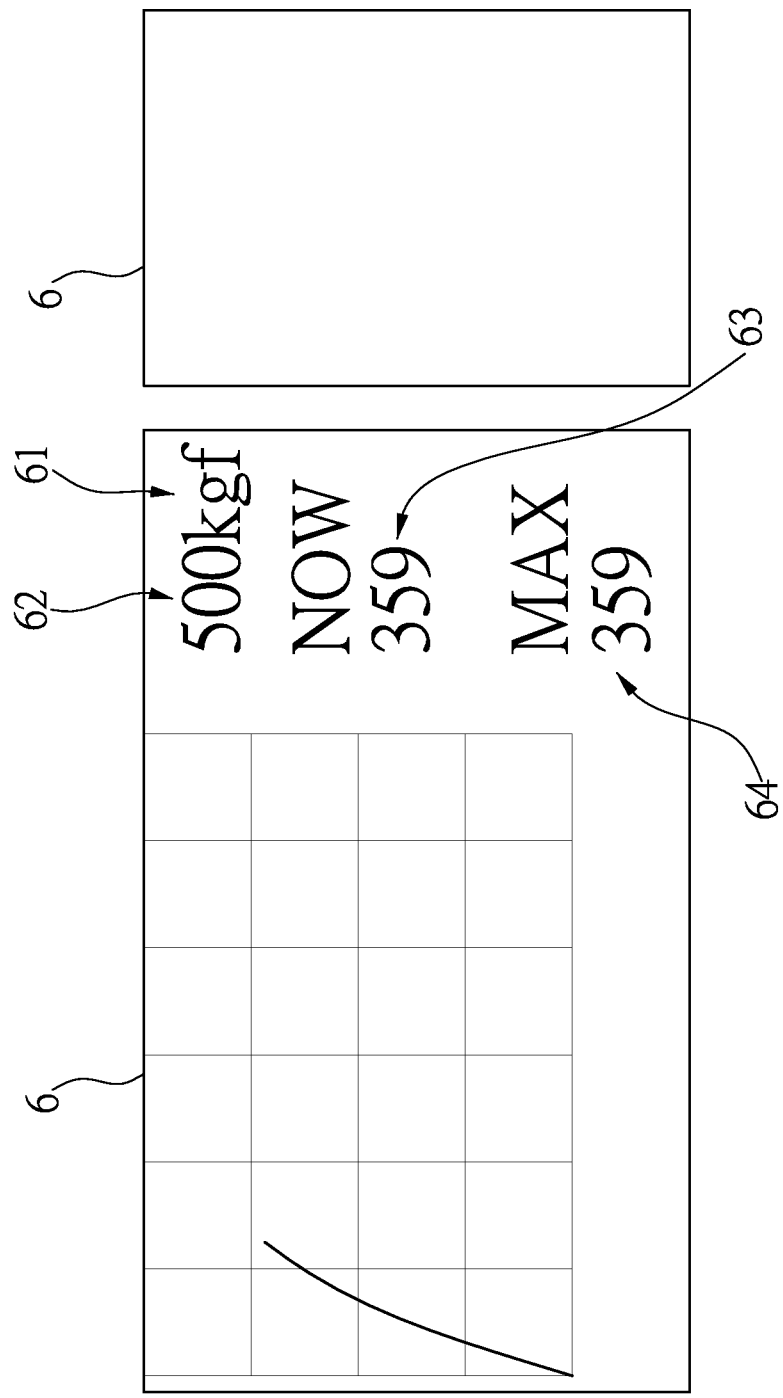
FIG. 4 is a schematic view of an operation of operating a rivet nut setting tool and displaying data value on a display device, according to the present invention.
Figure 5:
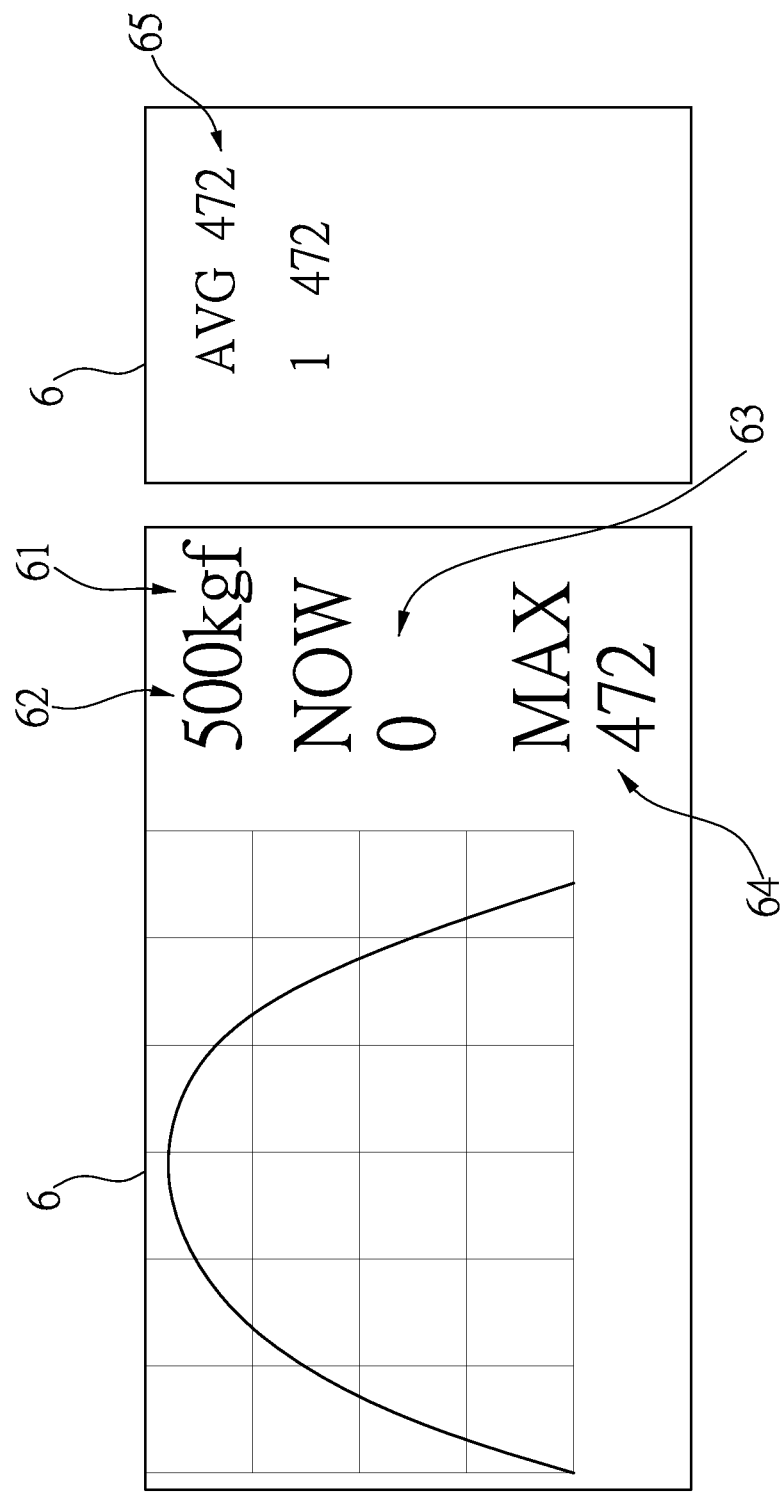
FIG. 5 is a schematic view of a display device displaying a full waveform, according to the present invention.
Figure 6:
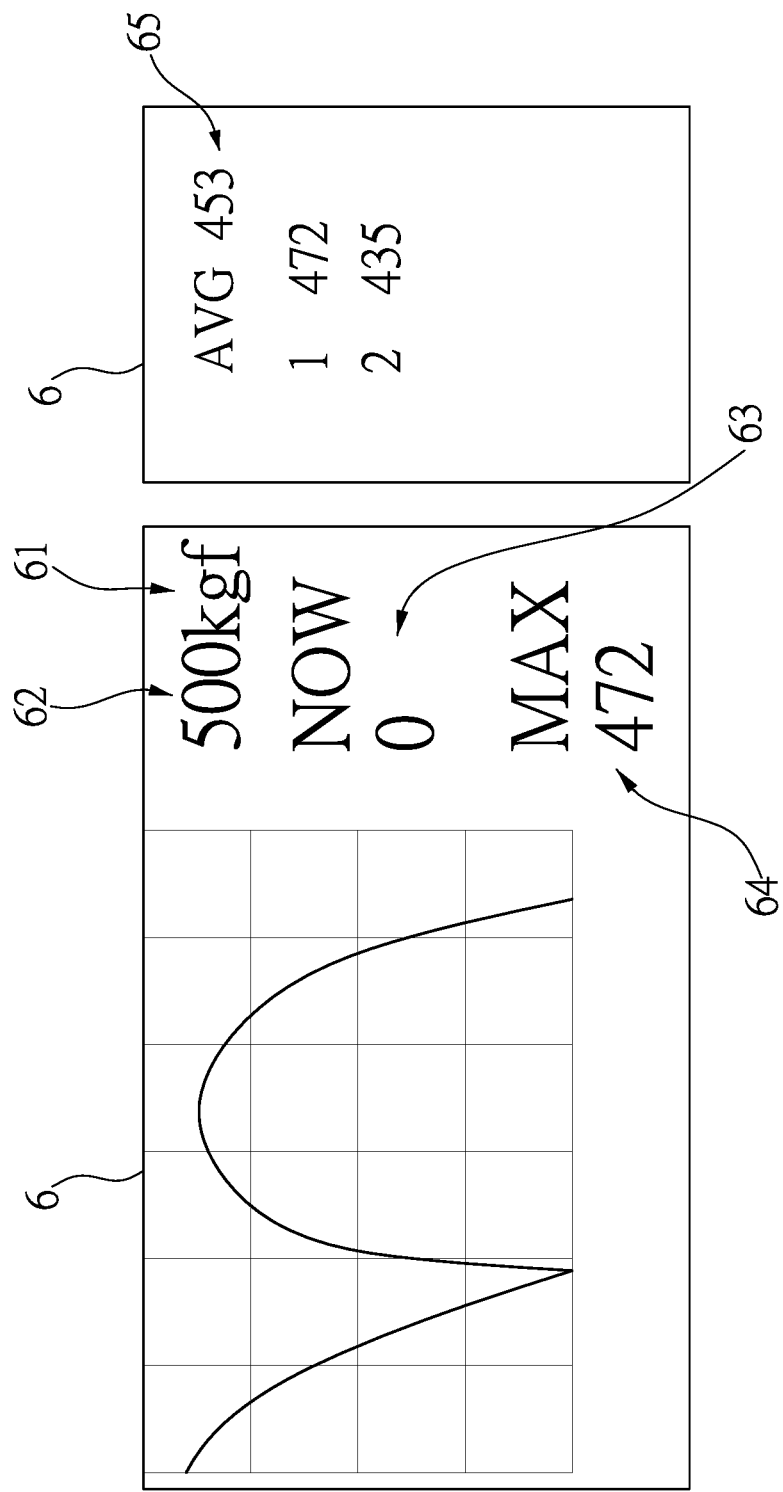
FIG. 6 is a schematic view of a display device displaying continuous waveform when a rivet nut setting tool is operated continuously, according to the present invention.

As shown FIG. 3, in order to use the portable test instrument of the present invention, the rivet nut setting tool 100 can just be mounted on the strain gauge 3 to start measuring, and during operation of the rivet nut setting tool 100, the strain gauge 3 is deformed to change the signal transmitted to the circuit module 2, and the circuit module 2 integrates the signal to display on the display device 6, as shown in FIG. 4, the display device 6 displays the waveform of the signal, and the display device 6 also displays the waveform data unit 61 (Kgf shown in FIG. 4 is a unit of force and taken as an example), an upper-limit waveform value 62, a current value 63, a historical maximum value 64 at the same time. As shown in FIG. 5, after the rivet nut setting tool 100 is completely operated once, one of the two display devices 6 displays a full waveform, and a screen of the other display device 6 records the value of the maximum pull force of this operation; after the rivet nut setting tool 100 is continuously operated, one of the display devices 6 displays a continuous waveform as shown in FIG. 6, and the screen of the other display device 6 also continuously records the values of the maximum pull forces and the average values 65 of many operations, and the older waveform continuously fades out in left side of the screen.

According to above-mentioned content, the portable test instrument of the present invention can measure the continuous variation of the pull force and record the maximum value during operation of the rivet nut setting tool 100, so that the pull force performance of the rivet nut setting tool 100 in current setting or adjusted setting can be measured to check whether the pull force generated for setting rivet nut is reduced, insufficient or excessive, thereby facilitating to accurately adjust the pull force of the rivet nut setting tool 100 into the range satisfying the requirement in setting a rivet nut.

Figure 7:
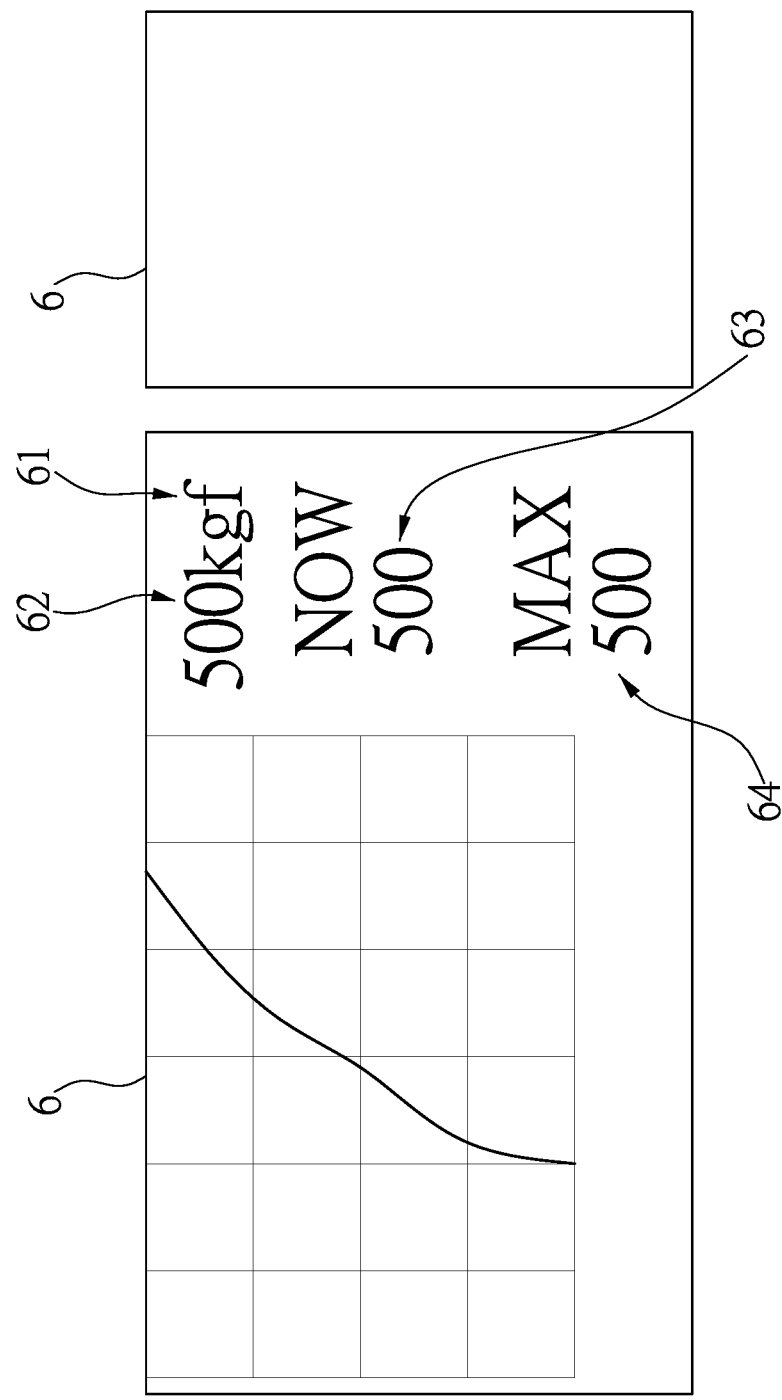
FIG. 7 is a schematic view of a display device displaying waveform when the pull force reaches a current upper-limit waveform value during operation of a rivet nut setting tool, according to the present invention.
Figure 8:
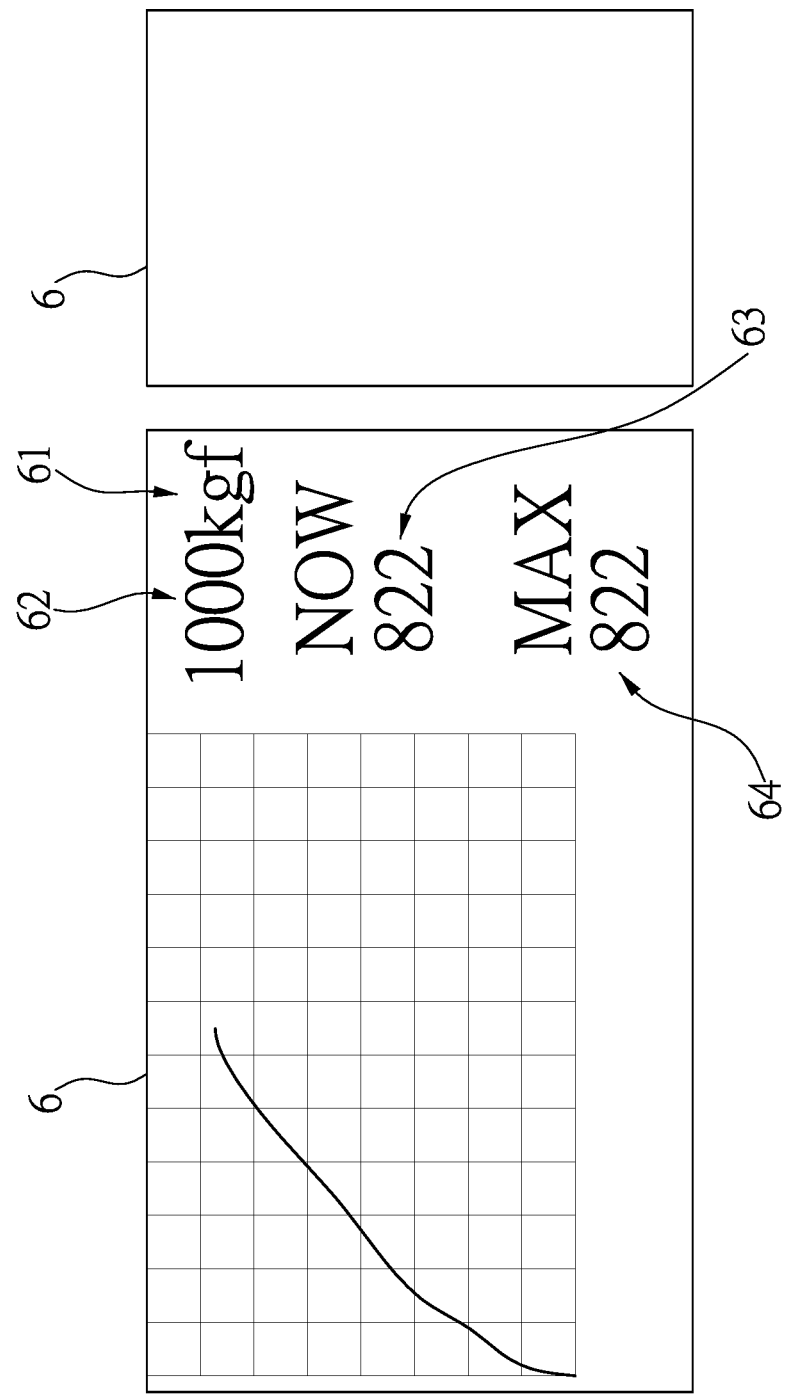
FIG. 8 is a schematic view of an upper-limit waveform value being switched from 500 Kgf up to 1000 Kgf, according to the present invention.
Figure 9:
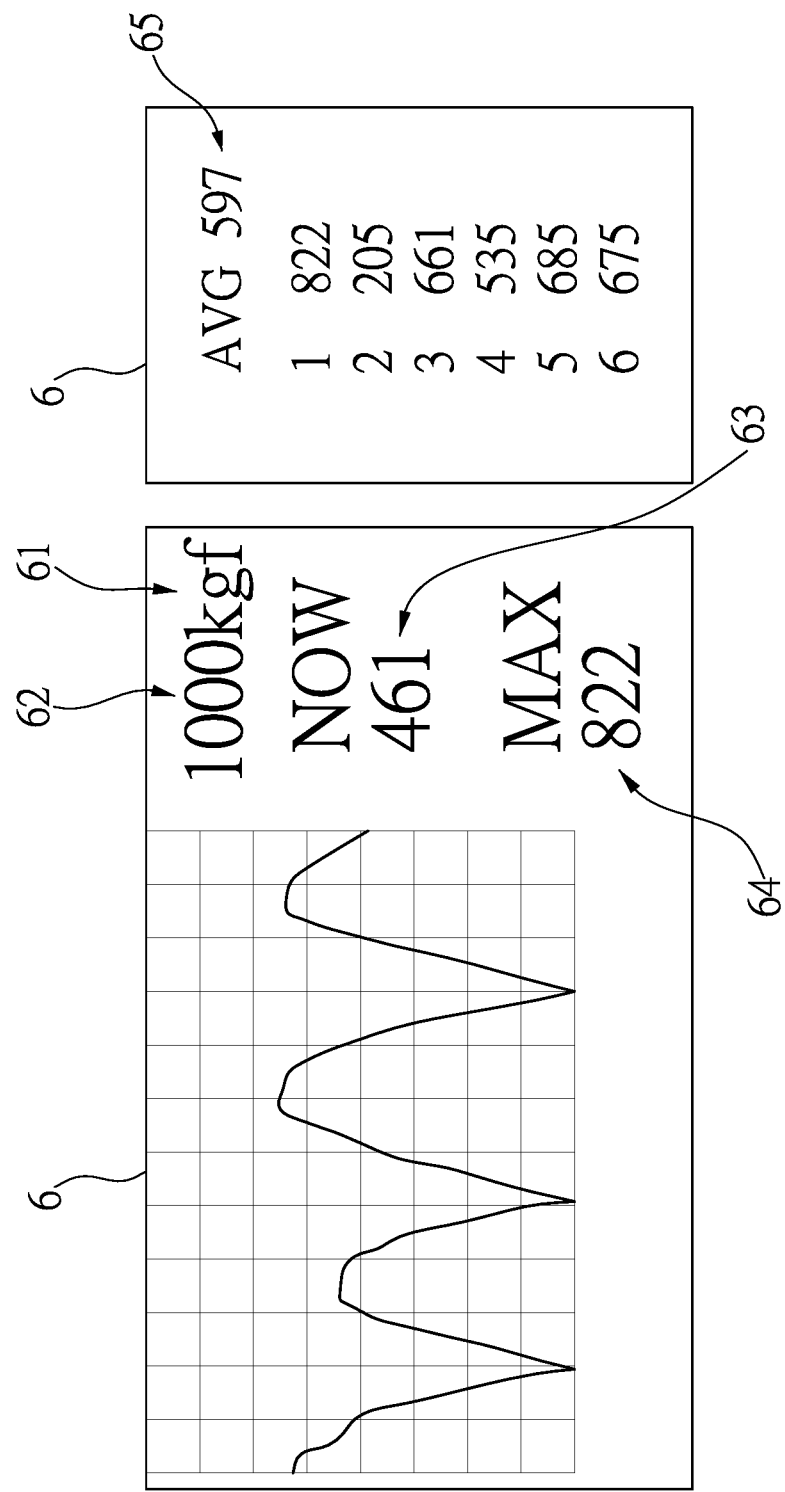
FIG. 9 is a schematic view of a display device displaying a continuous waveform when an upper-limit waveform value is 1000 Kgf, according to the present invention.

As shown in FIG. 7, when the pull force of the rivet nut setting tool 100 in current operation exceeds the current upper-limit waveform value 62, the circuit module 2 can change the upper-limit waveform value 62 in the moment that the waveform exceeds the current upper limit value, for example, the upper-limit waveform value 62 can be smartly switched from 500 Kgf up to 1000 Kgf, as shown in FIG. 8; or more waveforms can be displayed continuously, as shown in FIG. 9.

Figure 10:
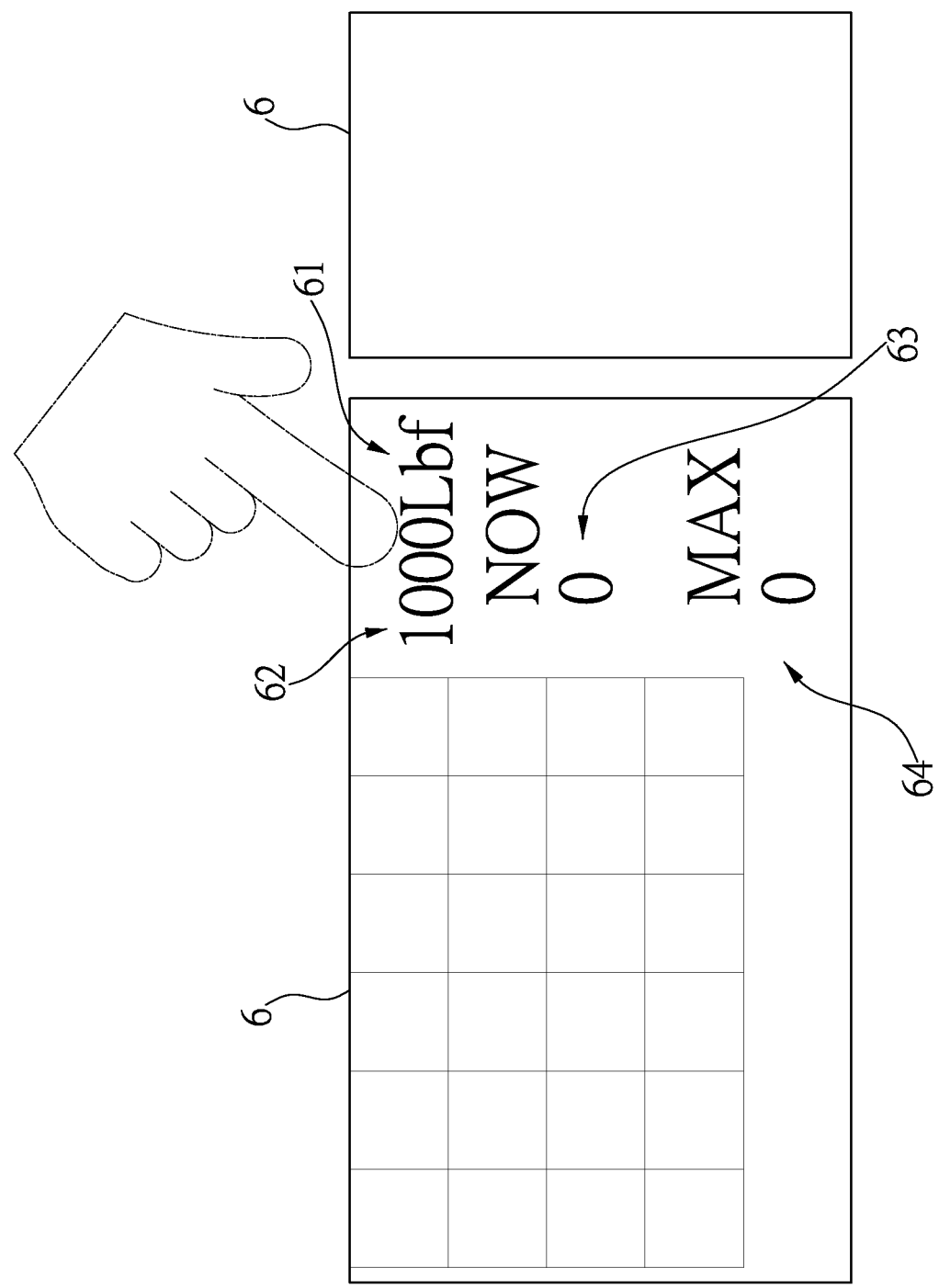
FIG. 10 is a schematic view of an operation of touching a display device to switch a waveform data unit by hand, according to the present invention.
Figure 11:
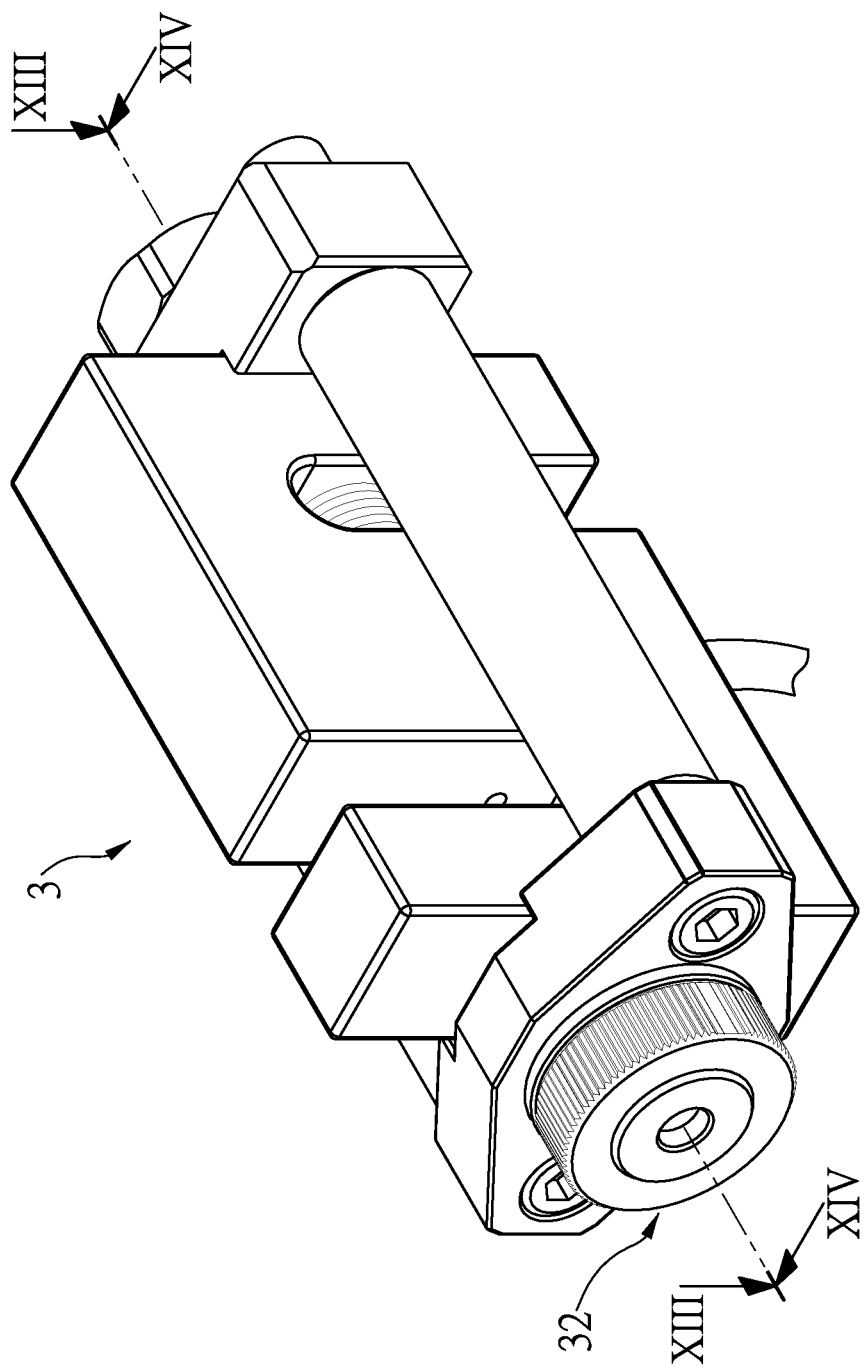
FIG. 11 is a perspective view of a strain gauge of the present invention.
Figure 12:
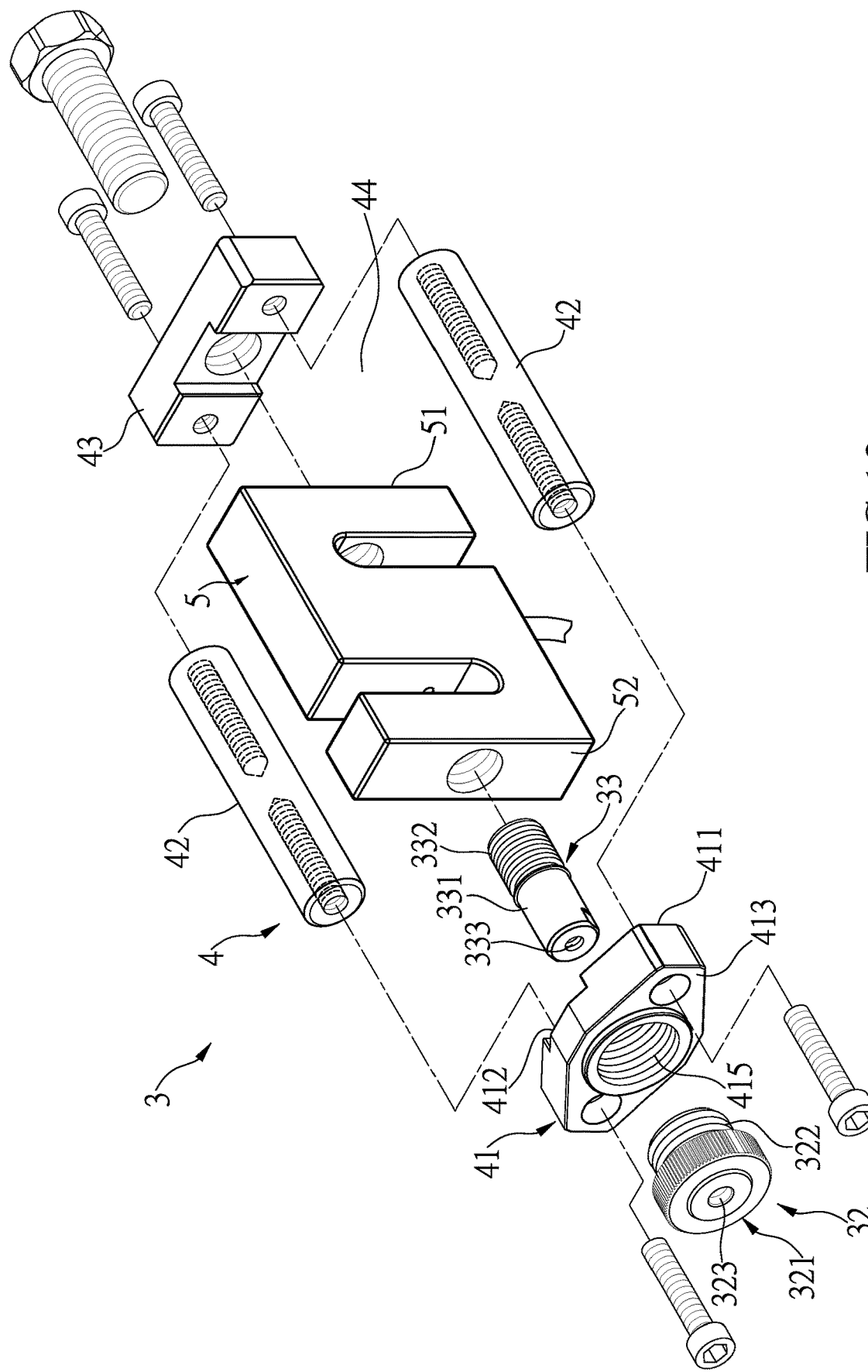
FIG. 12 is an exploded view of a strain gauge of the present invention.

As shown in FIG. 10, the at least one display device 6 can be touch-controlled type, and the display device 6 can be touched to switch the displayed waveform data unit 61 to one of Kgf, Lbf and N. Kgf, Lbf and N are units of force, and different country may have different usage habit in unit of force, so that the portable test instrument of the present invention can satisfy the operators having different usage habits.

As shown in FIGS. 11 to 15, the strain gauge 3 includes a support assembly 4, a strain measuring unit 5, a support member 32 and a pull pin 33. The support assembly 4 includes a head support 41, a plurality of lateral rods 42, and a tail support 43. Two ends of the plurality of lateral rods 42 are respectively connected to the head support 41 and the tail support 43, and around to form an accommodation area 44.

Two ends of the strain measuring unit 5 serve as a fastening end 51 and a force receiving end 52, respectively, and the strain measuring unit 5 is disposed in the accommodation area 44 and the fastening end 51 is fastened with the tail support 43, and a gap is formed between the force receiving end 52 and the head support 41. The head support 41 has an inner side 411 and a support side 413, and the inner side 411 faces toward the strain measuring unit 5. The head support 41 has a fastening hole 415 in communication with the inner side 411 and the support side 413, and the support member 32 includes a support part 321 and a connection part 322 connected to each other, the connection part 322 is connected to the fastening hole 415, the support part 321 is disposed on the support side 413, and the support member 32 has a through hole 323 in communication with the support part 321 and the connection part 322. The pull pin 33 includes a pin part 331 and a pin connection part 332 connected to each other, the pin connection part 332 is connected to the force receiving end 52, the pin part 331 is movably inserted into the through hole 323, the pin part 331 has a connection hole 333 in communication with the pin connection part 332, and configured to mount with the rivet nut setting tool 100. When being forced, the pull pin 33 pulls the strain measuring unit 5 to move toward the head support 4 and deform, and it causes reduction of the gap between the force receiving end 52 and the head support 41, and the pin part 331 is movable in the through hole 323.

The strain measuring unit 5 can be a strain gauge unit or a load cell; and in this embodiment, an S-type Strain gauge load cell is taken as an example of the strain measuring unit 5.

Figure 13:
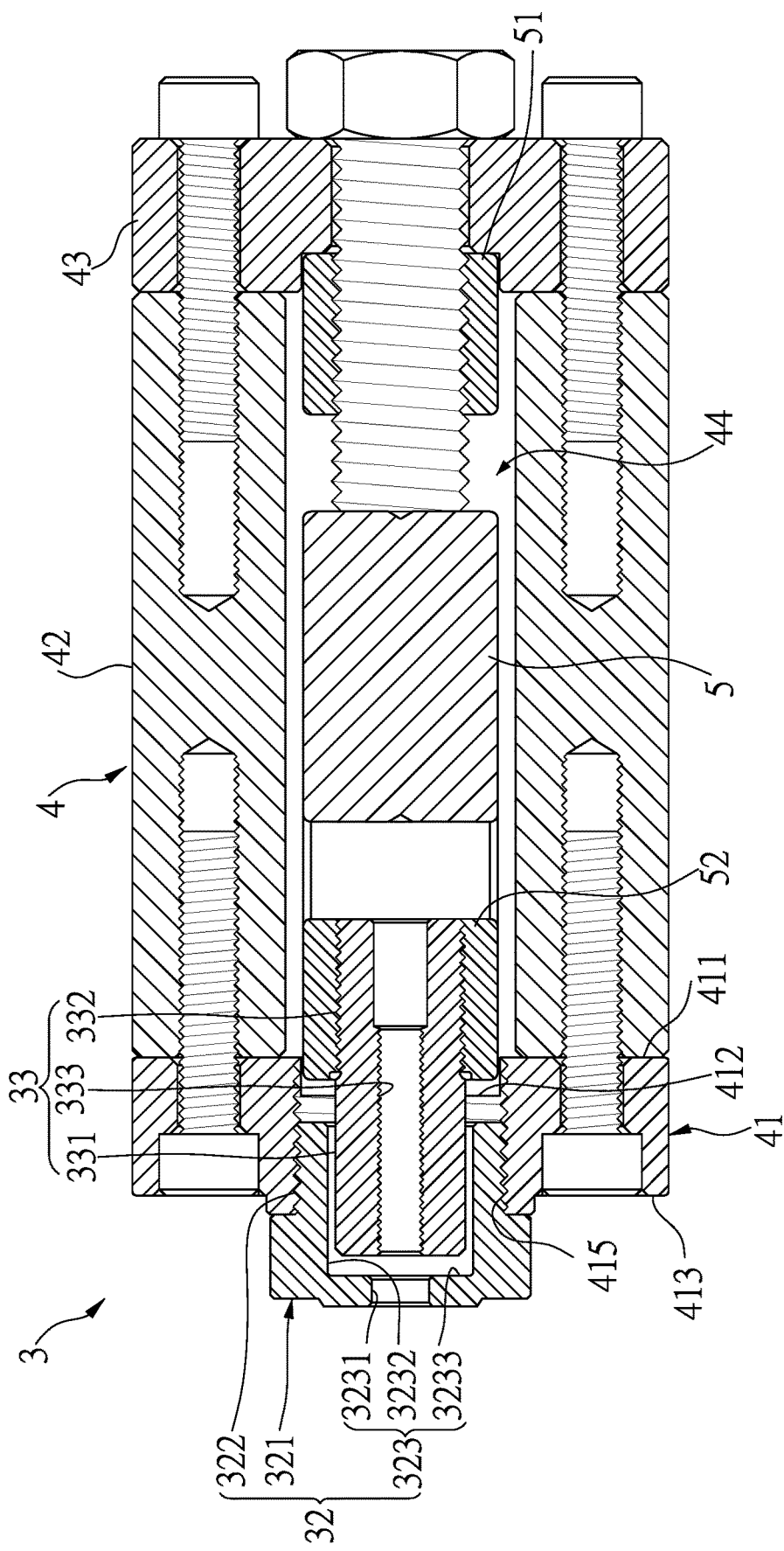
FIG. 13 is a schematic cross-sectional view taken along XIII-XIII of FIG. 11.
Figure 14:
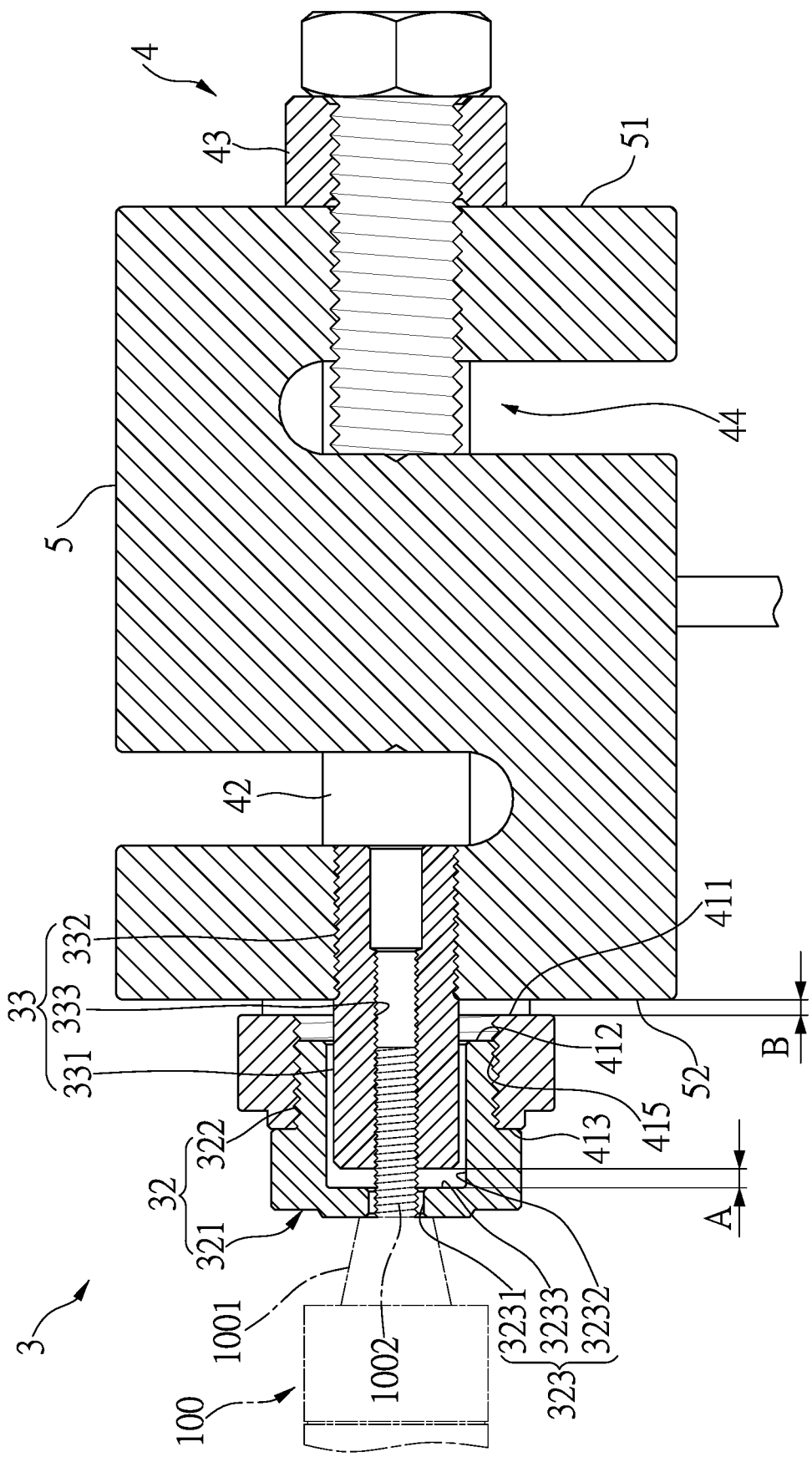
FIG. 14 is a schematic cross-sectional view taken along XIV-XIV of FIG. 11.
Figure 15:
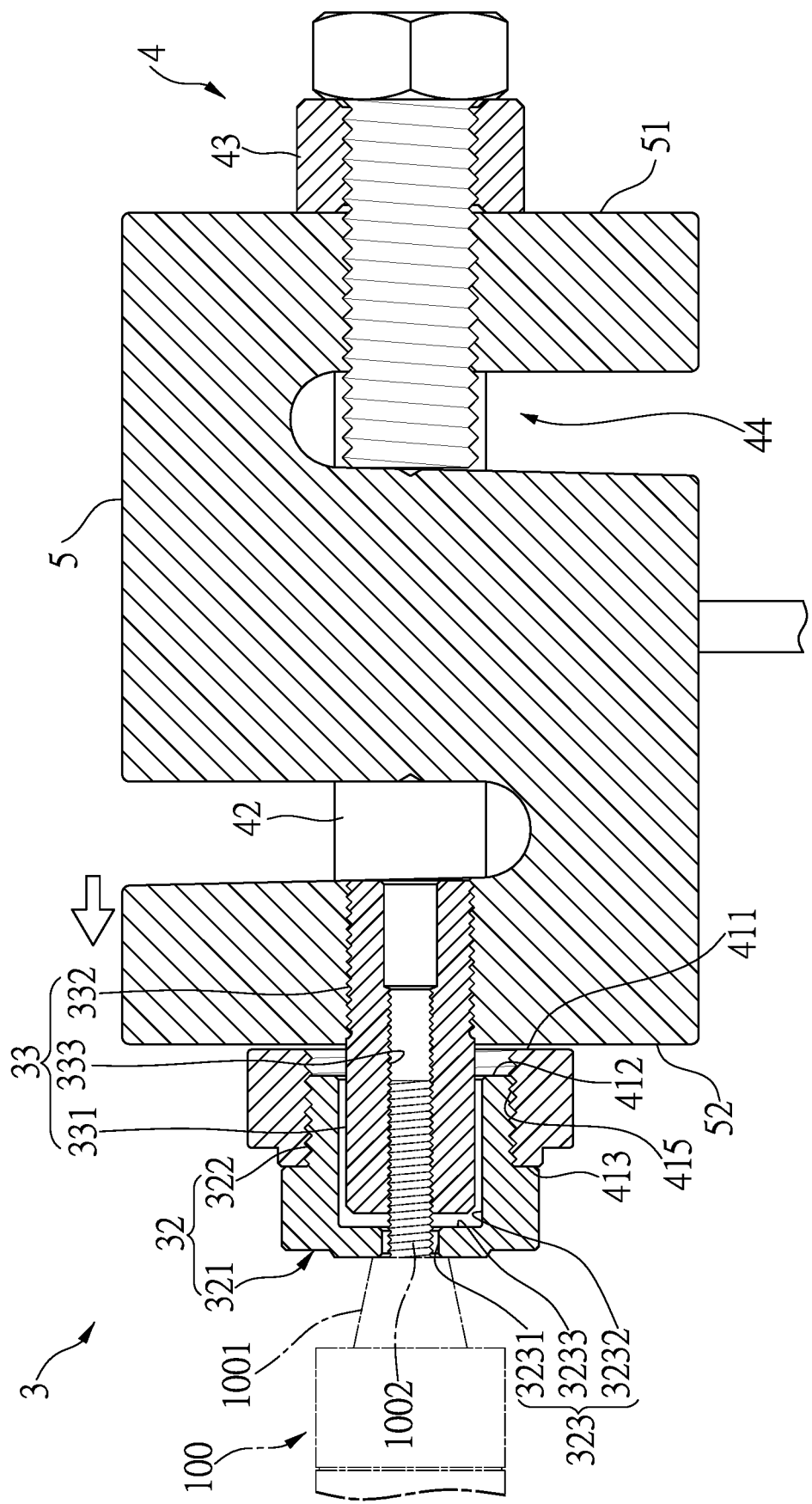
FIG. 15 is a schematic view of the strain measuring unit being pulled to deformed when the pull pin is applied by a force, according to FIG. 14.

The embodiment of the strain gauge 3 will be described in detail. As shown in FIGS. 13 and 14, the connection hole 333 of the pull pin 33 is configured to connect the bolt 1002 of the rivet nut setting tool 100, the support member 32 is configured to support the counter force generated by the main body 1001 during operation of the rivet nut setting tool 100. As shown in FIG. 15, the pull pin 33 is pulled toward the rivet nut setting tool 100 because of thread; since the fastening end 51 of the strain measuring unit 5 is fastened on the tail support 43 and the force receiving end 52 is connected to the pull pin 33, the pull pin 33 pulls the strain measuring unit 5 to deform when being moved, so that the signal transmitted to the circuit module 2 is changed.

As shown in FIGS. 11 to 15, the head support 41 has an activity groove 412 recessed on the inner side 411 of the head support 41, a part of the force receiving end 52 is disposed in the activity groove 412, and a gap is formed between the force receiving end 52 and the groove bottom of the activity groove 412, the activity groove 412 provides a sufficient space for each deformation of the force receiving end 52, so as to prevent the variation of the detected data from stopping because the strain measuring unit 5 is blocked by the head support to stop deformation; as a result, the measured maximum value can be increased.

As shown in FIG. 14, the through hole 323 has a narrow-diameter section 3231 and a wide-diameter section 3232 connected to each other, the pin part 331 is movably inserted into the wide-diameter section 3232, the through hole 323 has a drop surface 3233 formed on an end, in communication with the narrow-diameter section 3231, of the wide-diameter section 3232, and the drop surface 3233 is connected to the narrow-diameter section 3231, a distance A is formed between the pin part 331 and the drop surface 3233, a distance B is formed between the force receiving end 52 and the head support 41, and each of the distance A and the distance B is higher than a maximum deformation distance of the strain measuring unit 5; for example, in general, a deformation distance of the strain gauge load cell is lower than 0.5 mm, and it is assumed that each of the distance A and the distance B exceeds 2 mm, so the force receiving end 52 does not contact the head support 41 and the pin part 331 also does not contact the drop surface 3233 even if the strain measuring unit 5 is pulled to the maximum withstand value, thereby preventing the deformation of the strain measuring unit 5 from being blocked.

Figure 16:
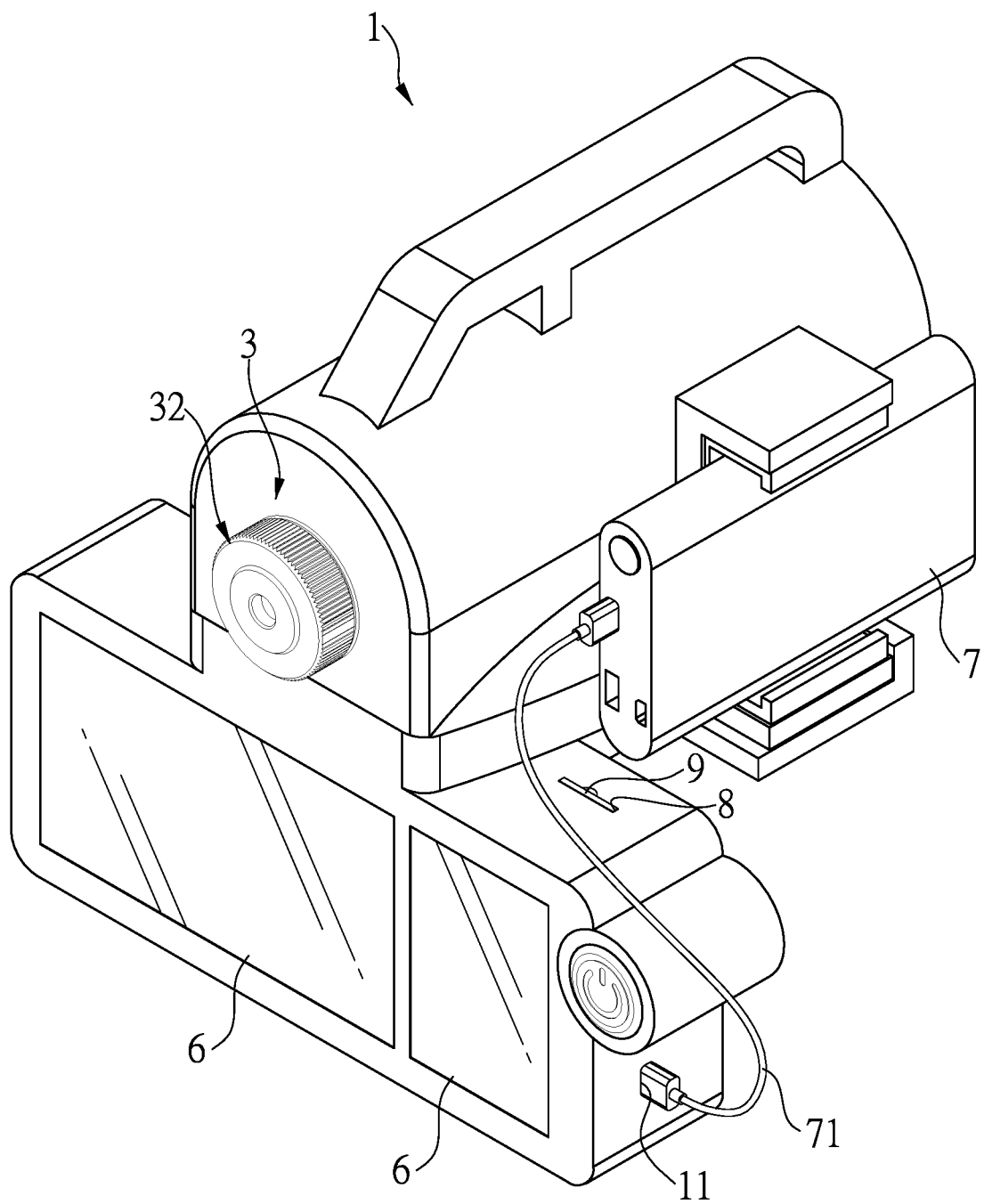
FIG. 16 is a perspective view of a portable test instrument of the present invention, when viewed from another angle.

As shown in FIGS. 2 and 16, the shell body 1 can include a mobile power supply 7 disposed thereon and electrically connected to the circuit module 2; the shell body 1 can include a power supply port 11 electrically connected to the circuit module 2, and the mobile power supply 7 can be electrically connected to the circuit module 2 to provide electrical power through the power line 71 and the power supply port 11; with this configuration, the portable test instrument of the present invention can be carried easily and can be used in environment without power outlet.

Figure 17:
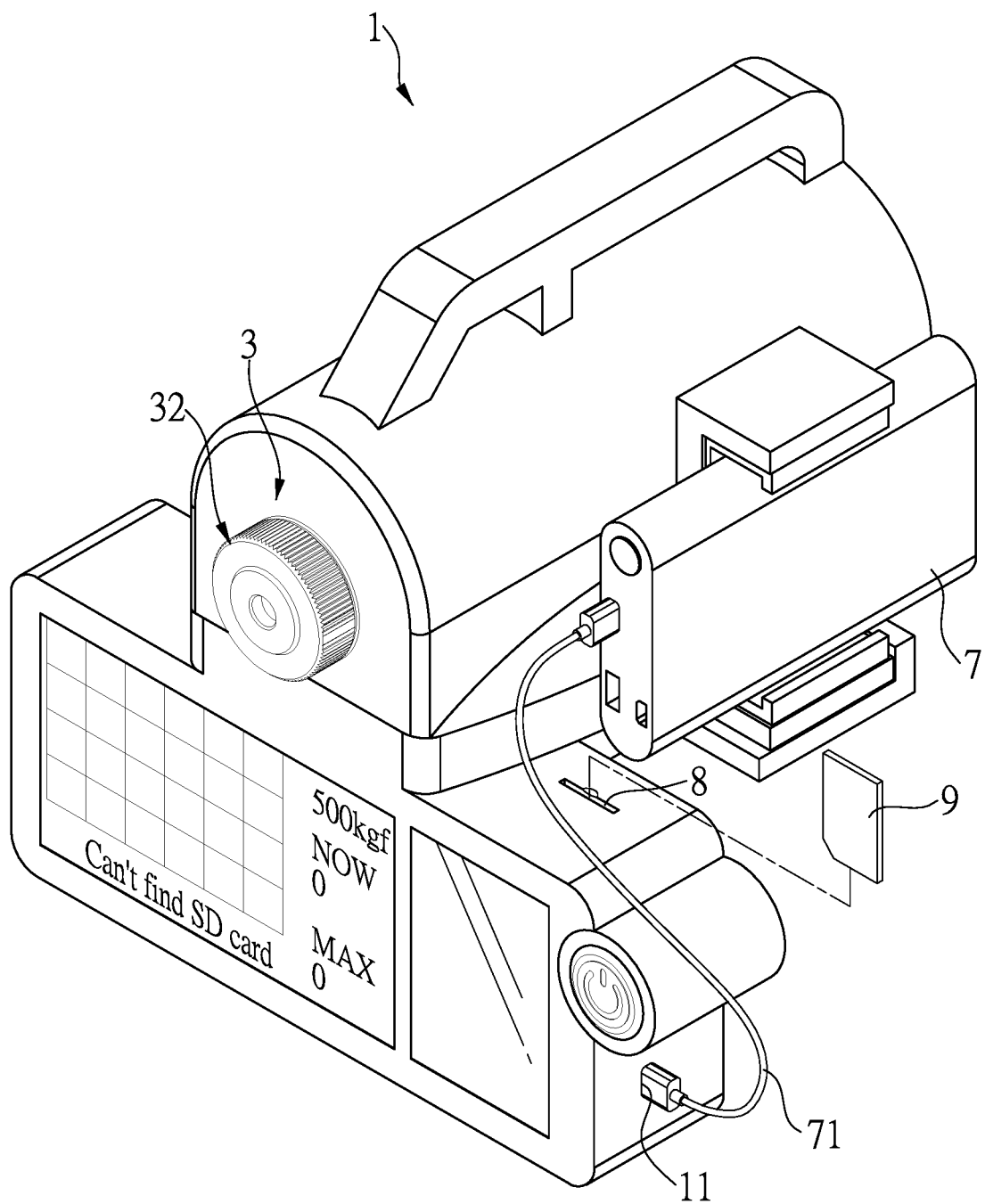
FIG. 17 is a schematic view of an operation of pulling a memory card out of the portable test instrument of the present invention.

As shown in FIG. 17, the shell body 1 can include a memory card slot 8 disposed thereon and electrically connected to the circuit module 2, and a memory card 9 can be inserted into the memory card slot and record the measured data conveniently; when the memory card 9 is not inserted into the memory card slot 8, the display device 6 can display a prompt indicative of failure to find the memory card 9.

Figure 18:
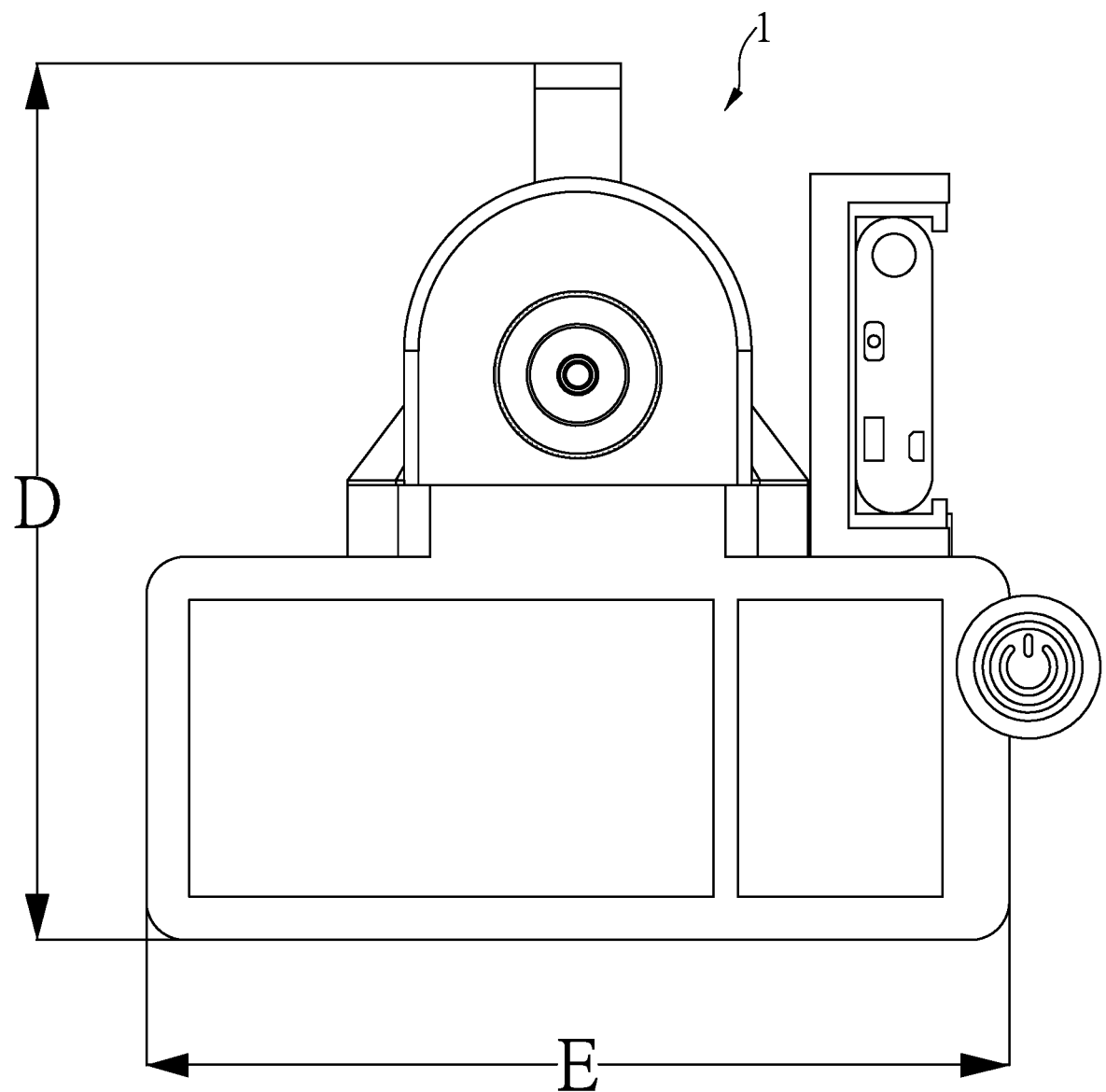
FIG. 18 is an elevational view of a portable test instrument of the present invention.
Figure 19:
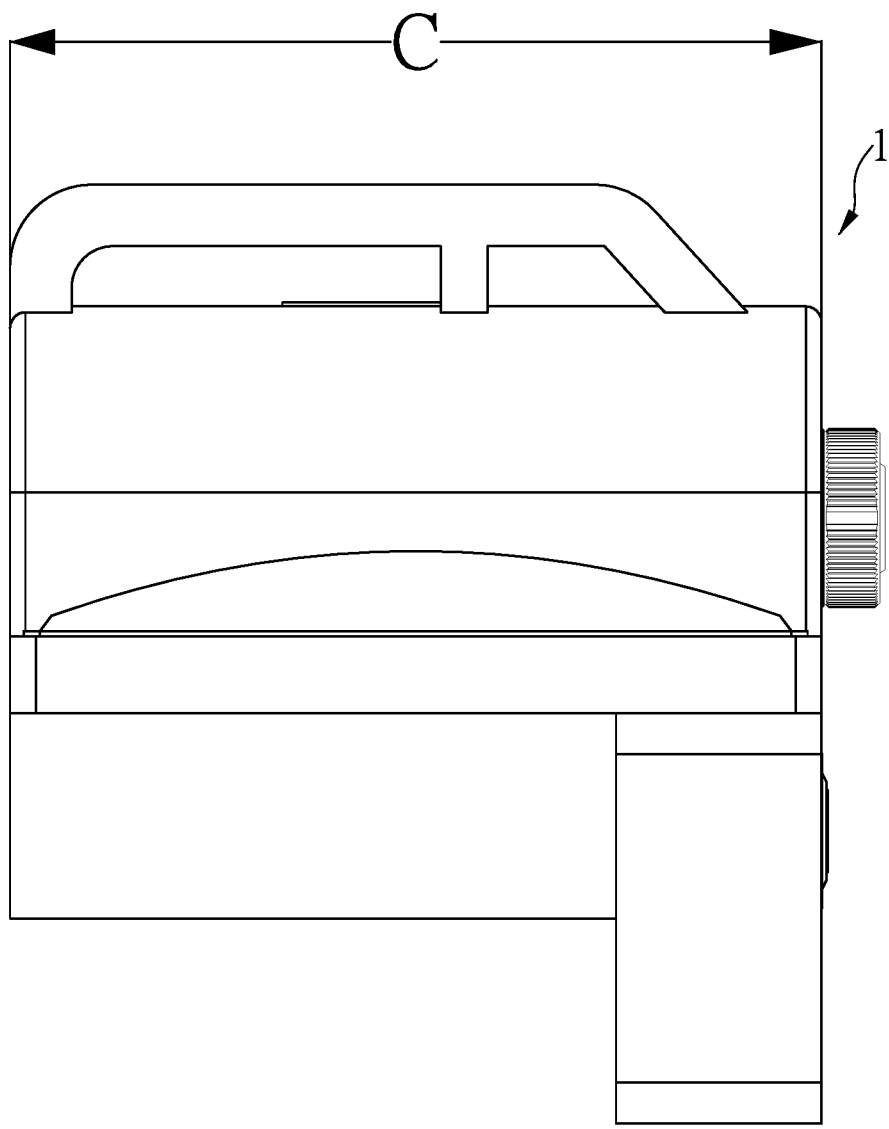
FIG. 19 is a side view of a portable test instrument of the present invention.

As shown in FIGS. 18 and 19, the shell body has a maximum width C, a maximum height D, and a maximum length E, and C is in a range of 16 cm to 50 cm, D is in a range of 21 cm to 50 cm, and E is in a range of 20 cm to 50 cm, and the size defined by the above-mentioned parameters is designed to be within a range of an easy-carry volume, so that the portable test instrument of the present invention can have good portability.

A total weight of the shell body, the circuit module, the strain gauge and the at least one display device is in a range of 3.5 KG to 10 KG, and also within a weight range for a general person to carry easily, so that the portable test instrument of the present invention can have good portability.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A portable test instrument for a rivet nut setting tool, comprising:
   a shell body;
   a circuit module disposed inside the shell body;
   a strain gauge having a part located inside the shell body and electrically connected to the circuit module, wherein an end of the strain gauge is exposed to the shell body and configured to mount with the rivet nut setting tool, and the strain gauge changes a value of a signal transmitted to the circuit module when being forced to deform, the strain gauge comprising a support assembly, a strain measuring unit, a support member and a pull pin, the support assembly comprising a head support, a plurality of lateral rods, and a tail support, two ends of the plurality of lateral rods respectively connected to the head support and the tail support, and around to form an accommodation area, two ends of the strain measuring unit serving as a fastening end and a force receiving end, respectively, and the strain measuring unit disposed in the accommodation area and the fastening end being fastened with the tail support, and a gap formed between the force receiving end and the head support, the head support comprising an inner side and a support side, the inner side facing toward the strain measuring unit, the head support having a fastening hole in communication with the inner side and the support side, the support member comprising a support part and a connection part connected to each other, the connection part connected to the fastening hole, the support part disposed on the support side, and the support member having a through hole in communication with the inner side and the connection part, the pull pin comprising a pin part and a pin connection part connected to each other, the pin connection part connected to the force receiving end, the pin part movably inserted into the through hole, the pin part having a connection hole in communication with the pin connection part and configured to mount with the rivet nut setting tool, wherein when being forced, the pull pin pulls the strain measuring unit to move and deform toward the head support, so as to reduce the gap between the force receiving end and the head support, and the pin part is moved in the through hole; and at least one display device disposed inside the shell body and electrically connected to the circuit module, and configured to display data measured by the strain gauge.

2. The portable test instrument according to claim 1, wherein a total weight of the shell body, the circuit module, the strain gauge and the at least one display device is in a range of 3.5 KG to 10 KG.

3. The portable test instrument according to claim 1, wherein the head support has an activity groove recessed on the inner side of the head support, a part of the force receiving end is disposed in the activity groove, and the gap is formed between the force receiving end and the groove bottom of the activity groove.

4. The portable test instrument according to claim 1, wherein the through hole comprises a narrow-diameter section and a wide-diameter section connected to each other, the pin part is movably inserted into the wide-diameter section, the through hole has a drop surface formed on an end, in communication with the narrow-diameter section, of the wide-diameter section thereof, and the drop surface is connected to the narrow-diameter section, a distance A is formed between the pin part and the drop surface, a distance B is formed between the force receiving end and the head support, and each of the distance A and the distance B is higher than a maximum deformation distance of the strain measuring unit.

5. The portable test instrument according to claim 1, wherein the shell body comprises a mobile power supply disposed thereon and electrically connected to the circuit module.

6. The portable test instrument according to claim 1, wherein the shell body comprises a memory card slot disposed thereon and electrically connected to the circuit module.

7. The portable test instrument according to claim 1, wherein the at least one display device displays the data in a waveform with waveform data unit.

8. The portable test instrument according to claim 7, wherein the at least one display device is touch-controlled type and configured to be touched to switch the currently-displayed waveform data unit to one of Kgf, Lbf and N.

9. The portable test instrument according to claim 1, wherein the shell body has a maximum width C, a maximum height D, a maximum length E, wherein C is in a range of 16 cm to 50 cm, D is in a range of 21 cm to 50 cm, and E is in a range of 20 cm to 50 cm.

* * * * *